(12) United States Patent
Balasubramaniam et al.

(10) Patent No.: US 10,896,428 B1
(45) Date of Patent: Jan. 19, 2021

(54) DYNAMIC SPEECH TO TEXT ANALYSIS AND CONTACT PROCESSING USING AGENT AND CUSTOMER SENTIMENTS

(71) Applicant: Amazon Technologies, Inc., Seattle, WA (US)

(72) Inventors: Balarajan Balasubramaniam, San Jose, CA (US); Brian Benjamin Hartley, Concord (CA); Mabel Karen Bo Ming Lee, Toronto (CA); Srdjan Majkic, Toronto (CA); Simon Gilles Meyffret, Toronto (CA); Mohammadrasool Raeesi Nafchi, Richmond Hill (CA); Derek Tong, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 15/842,716

(22) Filed: Dec. 14, 2017

(51) Int. Cl.
| | |
|---|---|
| *G06Q 30/00* | (2012.01) |
| *G10L 25/63* | (2013.01) |
| *G10L 25/24* | (2013.01) |
| *G10L 15/18* | (2013.01) |
| *G10L 15/02* | (2006.01) |
| *G10L 15/22* | (2006.01) |

(52) U.S. Cl.
CPC .......... *G06Q 30/016* (2013.01); *G10L 15/02* (2013.01); *G10L 15/1815* (2013.01); *G10L 15/22* (2013.01); *G10L 2015/223* (2013.01)

(58) Field of Classification Search
CPC ..... G06F 17/2775; G06Q 30/01; G10L 25/63; G10L 15/063

USPC .................................................. 704/251, 239
See application file for complete search history.

(56) References Cited

U.S. PATENT DOCUMENTS

| | | | | |
|---|---|---|---|---|
| 2012/0084111 | A1* | 4/2012 | Aggarwal | G06Q 30/01 705/7.14 |
| 2013/0173269 | A1* | 7/2013 | Adler | G06F 17/2775 704/251 |
| 2016/0019915 | A1* | 1/2016 | Khan | G10L 25/63 704/239 |
| 2017/0206890 | A1* | 7/2017 | Tapuhi | G10L 15/063 |
| 2017/0270099 | A1* | 9/2017 | Gorny | G06Q 30/01 |

OTHER PUBLICATIONS

Demircan, S., Feature Extraction from Speech Data for Emotion Recognition, Mar. 2014, 3 pages, Journal of Advances in Computer Networks, vol. 2, No. 1, http://www.jacn.net/papers/76-S3012.pdf.

(Continued)

*Primary Examiner* — Farzad Kazeminezhad
(74) *Attorney, Agent, or Firm* — Knobbe, Martens, Olson & Bear, LLP

(57) ABSTRACT

A dynamic contact management system is provided for analyzing aspects of speech from a customer contact and generating dynamic output based on the analysis. The system can process audio data representing utterances that occur during a customer contact, wherein the processing comprises generating scores based on agent and customer sentiments determined using their respective speech to text data. Based on the processing, the system can generate scores for use in dynamically determining which actions to take, updating displays, analyzing contact outcomes over time, etc.

17 Claims, 7 Drawing Sheets

(56) References Cited

OTHER PUBLICATIONS

Hewlett, S., Emotion Detection from Speech, 5 pages, http://cs229.stanford.edu/proj2007/ShahHewlett%20-20Emotion%20Detection%20from%20Speech.pdf.

Sapra, A., Emotion Recognition from Speech, Feb. 2013, 5 pages, vol. 3, Issue 2, International Journal of Emerging Technology and Advanced Engineering, Jaypee Institute of Information Technology, Noida, http://citeseerx.ist.psu.edu/viewdoc/download?doi=10.1.1.413.6153&rep=rep1&type=pdf.

* cited by examiner

DYNAMIC SPEECH TO TEXT ANALYSIS AND CONTACT PROCESSING USING AGENT AND CUSTOMER SENTIMENTS

BACKGROUND

Generally described, customer service centers provide a centralized mechanism to handle customer contacts across a variety of contexts. For example, customer service centers may be implemented to handle contacts relating to sales and marketing, technical support, and billing. Some customer service centers provide follow-up evaluations to customers regarding the resolution of the customer contact, or the overall experience of the customer with respect to the customer contact. The responses to these follow-up evaluations are used to verify customer satisfaction, evaluate customer service agents, or otherwise improve the quality of the service provided by the customer service centers.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
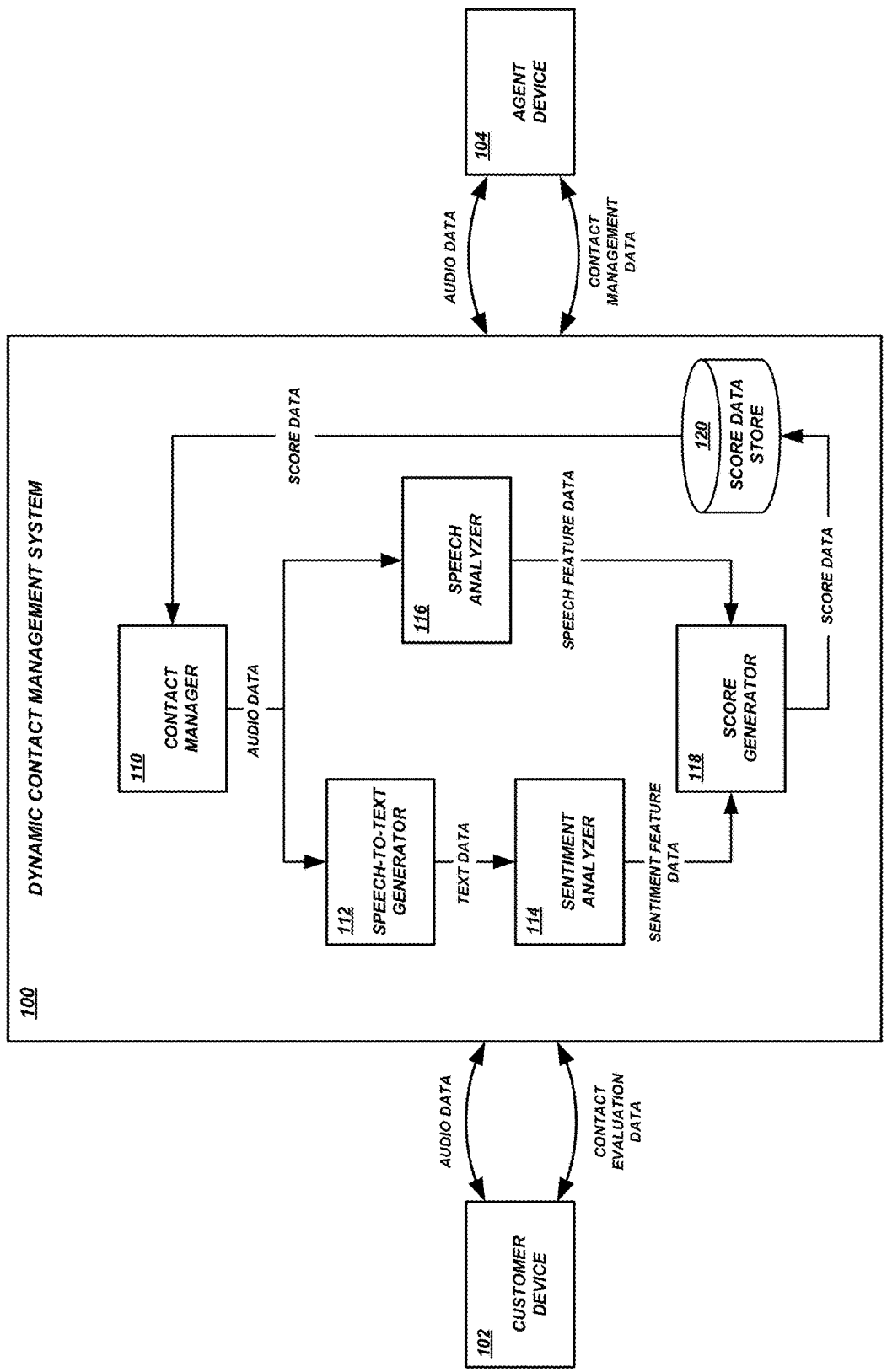
FIG. 1 is a block diagram of various data flows and interactions between a dynamic contact management system, a customer device, and an agent device according to some embodiments.

The present disclosure is directed to a system that analyzes aspects of speech from a customer contact and generates dynamic output based on the analysis. The system can process audio data representing utterances that occur during a customer contact. Based on the processing, the system can generate scores for use in dynamically determining which actions to take, presenting information regarding customer contacts, analyzing customer contact outcomes over time, evaluating customer service agent performance, etc. The scores may indicate an emotional state of a customer with respect to service provided during a customer contact, a stress level of a customer and/or an agent during a customer contact, etc. Advantageously, the dynamic determination of scores representing customer and/or agent state in connection with customer contacts allows the system to increase the likelihood of satisfactory customer contact outcomes. For example, a score may indicate a degree to which a customer's vocal pitch and word choice represent satisfaction with service provided by an agent. As another example, a score may indicate a degree to which an agent's vocal pitch and word choice represent a degree to which the agent is experiencing stress in providing service. Based on one or more of the scores, the system can present dynamic, real-time information to an agent regarding the state of the customer, recommend statements or other interactions with the customer, and the like. In addition, or alternatively, the system can make determinations about which evaluations to invite the customer to provide after the customer contact, which customer contacts should be routed to which agents, etc.

Generally described, a customer contact, also referred to herein as a "contact" for convenience, may be any conversation or other communication related to an issue, question, or other topic of interest. The contact may be initiated by, received from, or otherwise include communication with a customer or other entity. The contact may take any of a variety of forms. For example, a contact may include a conversation (e.g., a telephone call, video call, online voice chat, etc.) initiated by a customer regarding an issue with a product. Customer contacts may be initiated for any of a variety of reasons, such as contacts for refunds, replacements, exchanges, service requests, and the like. The example contacts described herein are illustrative only, and are not intended to be limiting. In some embodiments, a customer service system may deal with any or all of these contacts, other types of contacts, some combination thereof, etc.

Some customer service systems may solicit customer feedback after a customer contact. For example, customers may be invited to complete a survey or other evaluation immediately after the customer contact is over, or customers may be sent follow-up communications inviting them to complete a survey or other evaluation. However, many customers do not complete the evaluations, or only complete the evaluations in certain circumstances (e.g., after a particularly unsatisfactory experience). Some customer service systems attempt to assign customer contacts to an appropriate agent who is specifically trained to resolve the customer contact in a satisfactory manner. However, the agents may not be performing in an optimal manner at all times, and customer service systems may not identify when such situations arise in time to adjust the types of contacts assigned to the agents or perform some other intervening task. By evaluating vocal pitch and word choice of customers and/or agents to determine their level of satisfaction with a customer contact (or a series of customer contacts), a customer service system can select evaluations that are tailored to the way in which a particular customer contact may have affected a customer. Alternatively, or in addition, by evaluating speech characteristics of customers and/or agents, a customer service system can avoid assigning certain customer contacts—or any customer contacts at all—to agents who may not be currently performing in a satisfactory manner.

Some aspects of the present disclosure relate to the dynamic analysis of audio data associated with customer contacts to determine a state of a customer and/or an agent, such as the emotional state. The audio data can represent utterances, vocal pitch, and other speech-related aspects of a customer contact. Such audio data may also be referred to as speech data. In some embodiments, a customer service system may process speech data, such as speech data represented by audio signal from a voice call (e.g., telephone call, video call, online voice chat, etc.) between a customer and an agent, obtained with prior notification to and consent from the customer. The customer service system may generate a textual representation of the voice call, such as a transcription, using a speech-to-text subsystem. The customer service system may analyze the textual representation using a sentiment analysis subsystem to determine a sentiment of a speaker (e.g., customer or agent) from the words that have been used. The customer service system may also analyze the speech data using a speech analysis subsystem to determine an emotion of the speaker from the audio characteristics of their speech (e.g., pitch). The customer service system can use the determined sentiment and emotion to generate a state score representative of a current state of the speaker (e.g., a customer state score for a customer, or an agent state score for an agent). In some embodiments, the particular state that is identified and represented by the state score may be degree of satisfaction, in which case the score may alternatively be referred to as a satisfaction score. In some embodiments, the particular state that is identified and represented by the state score may be degree of stress or an emotional state. The example states described herein are illustrative only, and are not intended to be limiting. In some embodiments, additional or alternative states may be determined and/or represented by a score without departing from the scope of the present disclosure.

Additional aspects of the present disclosure relate to use of the customer state scores generated from customer speech data during customer contacts. In some embodiments, customer state scores may be generated continuously or periodically during the course of a customer contact. A visual display may be generated that summarizes the various scores such that changes and trends in the scores can be identified. For example, an agent may be presented with a visual display of customer state scores during a customer contact so that the agent can be informed of the current state of the customer and any changes in the customer's state. As another example, the different customer state scores can be correlated by time with the specific words or other interactions that occurred at the time so that possible causes for changes in state can be identified. The customer state scores may also or alternatively be used to recommend what an agent should say to a customer. For example, if a customer state score indicates a low level of satisfaction with the customer contact, then the customer service system can recommend certain questions or statements that may uncover the cause of the low level of satisfaction or aid in raising the level of satisfaction. In some embodiments, customer state scores may be used to determine whether to invite a customer to submit an evaluation after a customer contact and/or to determine which particular aspects are to be evaluated. For example, if a customer contact has been completed and the associated issue that caused the customer to initiate the customer contact has been resolved, but the customer state score indicates a low level of satisfaction, the customer can be invited to provide feedback on the agent or the customer contact experience in general. As another example, if an issue has not been resolved but the customer state score indicates a neutral or high level of satisfaction, the customer can be invited to provide feedback on the issue itself.

Further aspects of the present disclosure relate to the use of agent state scores generated from agent speech data. In some embodiments, an agent's speech may be analyzed to generate state scores representative of the state of the agent. If an agent is showing low levels of satisfaction or high levels of stress, as indicated by the agent state scores or changes in the agent state scores, then the routing of customer contacts may be altered. For example, an agent associated with an agent state score indicating a high level of stress may be given a break from processing customer contacts, or assigned for a period of time to customer contacts that are expected to be less stressful. In some embodiments, agent state scores may be used during customer contacts. For example, agent state scores may be used individually, or in combination with customer state scores, to recommend particular questions or statements that may improve the success of the customer contact as perceived by the customer and/or the agent.

Although aspects of some embodiments described in the disclosure will focus, for the purpose of illustration, on particular examples of contacts, speech attributes, states, and underlying data associations, the examples are illustrative only and are not intended to be limiting. In some embodiments, the techniques described herein may be applied to additional or alternative contacts, speech attributes, states, and underlying data associations. Illustratively, some embodiments described herein relate to particular types of customer contacts, such as contacts involving a telephone call. However, in some embodiments the analysis, scoring, and/or other processing described herein may be applied to other conversations. For example, conversations that include one or more users (customers, agents, other parties, some combination thereof, etc.) speaking, generating text, and/or using other forms of communication may be analyzed, scored, and/or otherwise processed as described herein.

Network-Based Customer Service Environment

With reference to an illustrative embodiment, FIG. 1 shows a network environment in which aspects of the present disclosure may be implemented. As shown, the network environment may include a dynamic contact management system 100, a customer device 102, and an agent device 104. The customer device 102 and agent device 104 may communicate with the dynamic contact management system 100 and/or each other via one or more communication networks. Communication networks are also referred to herein as "networks" for convenience.

In some embodiments (e.g., when a customer device 102 is a telephone), the network over which the customer device 102 communicates may be a circuit-switched network or other telephone network. For example, the network may be a publicly-accessible telephone network, such as the public switched telephone network ("PSTN") or a cellular telephone network. In these embodiments, the network may be referred to as a "phone network" to highlight its use as a network for transmitting telephone communications such as telephone call audio, text messages, and the like. In other embodiments, such as when a customer device 102 is configured to establish voice calls using voice over IP ("VOIP") or communicate using other computer-based methods (e.g., instant message, email, etc.), then the network over which the customer device 102 communicates may be a packet-switched data network. For example, the network may be a publicly-accessible network of linked networks, possibly operated by various distinct parties, such as the Internet. In some cases, the network may include a private network, personal area network, local area network, wide area network, cable network, satellite network, cellular data network, etc., or a combination thereof, some or all of which may or may not have access to and/or from the Internet. In these embodiments, the network may be referred to as a "data network" to highlight its use as a network for transmitting bit-encoded data.

In some embodiments, the network over which the agent device 104 communicates may be or include a phone network and/or a data network, similar to the network over which the customer device 102 communicates, depending upon the particular agent device 104 or communication method being used for a given contact. In some embodiments, the network over which the agent device 104 communicates may be the same as, or distinct from, the network over which the customer device 102 communicates. For example, although the networks are described above as separate networks, in some embodiments a single network may be used by both customer device 102 and agent device 104 to communicate with the dynamic contact management system 100 and/or each other.

The dynamic contact management system 100, which may be part of a customer service system or include various features of a customer service system, may include various components for providing the features described herein. The dynamic contact management system 100 may include a contact manager 110 for managing communications between the customer device 102 and agent device 104, and for managing the process of resolving a customer contact through performance of various actions. For example, the contact manager 110 may obtain customer scores and/or agent scores, and use the scores to recommend questions or comments, determine which evaluation questions to ask, and the like. The dynamic contact management system 100 may also include a speech-to-text generator 112 for generating textual representations of utterances made during customer contacts. The dynamic contact management system 100 may also include a sentiment analyzer 114 for determining a sentiment of an utterance or set of utterances. The dynamic contact management system 100 may also include a speech analyzer 116 for determining an emotion of speech. The dynamic contact management system 100 may also include a score generator 118 for generating customer state scores and/or agent state scores using information provided by other subsystems of the dynamic contact management system 100.

The dynamic contact management system 100 may also include one or more data stores for storing information used by, or generated by, various subsystems of the dynamic contact management system 100. For example, a score data store 120 may store the customer state scores and/or agent state scores generated by the score generator 118 and/or other information, depending upon the features provided by the dynamic contact management system 100. In some embodiments, the customer state scores and/or agent state scores may be accessed from the score data store 120 by systems external to the dynamic contact management system 100, or subsystems of the dynamic contact management system 100 not shown. Illustratively, an agent evaluation system may access scores and/or other information regarding contacts in order to evaluate agent performance. For example, performance of a particular agent may be based on, e.g., an average customer state score over the course of some or all contacts processed by the agent. As another example, performance of a particular agent may be based on a combination of scores and other information, such as a combination of customer state scores, agent state scores, evaluation question responses received from customers after a contact has ended, and/or other contact outcome data.

The example subsystems and data stores of the dynamic contact management system 100 shown in FIG. 1 are illustrative only, and are not intended to be limiting. In some embodiments, a dynamic contact management system 100 may have fewer, additional, and/or alternative subsystems and data stores.

The dynamic contact management system 100 may be implemented on one or more physical server computing devices that provide computing services and resources to customer devices 102 (also referred to as "user devices"). In some embodiments, the dynamic contact management system 100 (or individual components thereof, such as the contact manager 110, speech-to-text generator 112, sentiment analyzer 114, speech analyzer 116, score generator 118, etc.) may be implemented on one or more host devices, such as blade servers, midrange computing devices, mainframe computers, desktop computers, or any other computing device configured to provide computing services and resources. For example, a single host device may execute one or more contact managers 110, speech-to-text generators 112, sentiment analyzers 114, speech analyzers 116, score generators 118, score data stores 120, some combination thereof, etc. The dynamic contact management system 100 may include any number of such hosts.

In some embodiments, the features and services provided by the dynamic contact management system 100 may be implemented as web services consumable via one or more communication networks. In further embodiments, the dynamic contact management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual customer devices 102 and agent devices 104 may be any of a wide variety of electronic communication devices, including telephones, personal computing devices, terminal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances.

In some embodiments, a customer or agent may use a system of multiple devices, rather than a single customer device 102 or agent device 104. For example, a customer may use a telephone to communicate verbally with an agent while also using a tablet computing device to communicate textually, via video, or as the source of the issue that gave rise to the contact. As another example, an agent may use a desktop computer to view information about the customer and information about how to resolve the issue that gave rise to the contact, while also using a telephone to communicate verbally with the customer. In some embodiments, the agent device 104 may be an unattended device, such as a server or other computing device that automatically generates responses or other dialogue turns. For example, the agent device 104 may execute an automated voice dialog system, or a text-based "chatbot" system, that interfaces with the customer device 102. The speech characteristics of the voice generated by an automated dialog system, and/or the content of dialog generated by an automated voice dialog system or text-based system, may be altered based on the state scores generated as described in detail below.

As shown in FIG. 1, a customer device 102 and an agent device 104 may send audio data to, and receive audio data from, the dynamic contact management system 100 during a customer contact. For example, a customer may initiate the contact by using the customer device 102 to establish communication with the dynamic contact management system 100, such as by making a telephone call, a video call, etc. Information regarding the nature of the contact may also be provided to the dynamic contact management system 100. Illustratively, metadata may be associated with the communication, such as an account identifier for the customer, information identifying the item or issue about which the customer is calling, etc. In one specific, non-limiting example, the contact may be initiated as a voice call from the customer device 102 to the dynamic contact management system 100, and the dynamic contact management system 100 may obtain or generate metadata indicating the contact is in relation to a particular item, such as an item the customer purchased and for which the customer would like a refund or exchange. The contact manager 110 may assign the contact to a particular agent account based on the metadata, agent workloads, and/or some other criteria. The contact manager 110 may establish an audio connection between the customer device 102 and an agent device 104 associated with the assigned agent account. The customer associated with the customer device 102 may then speak with the agent associated with the agent device 104.

Figure 3:
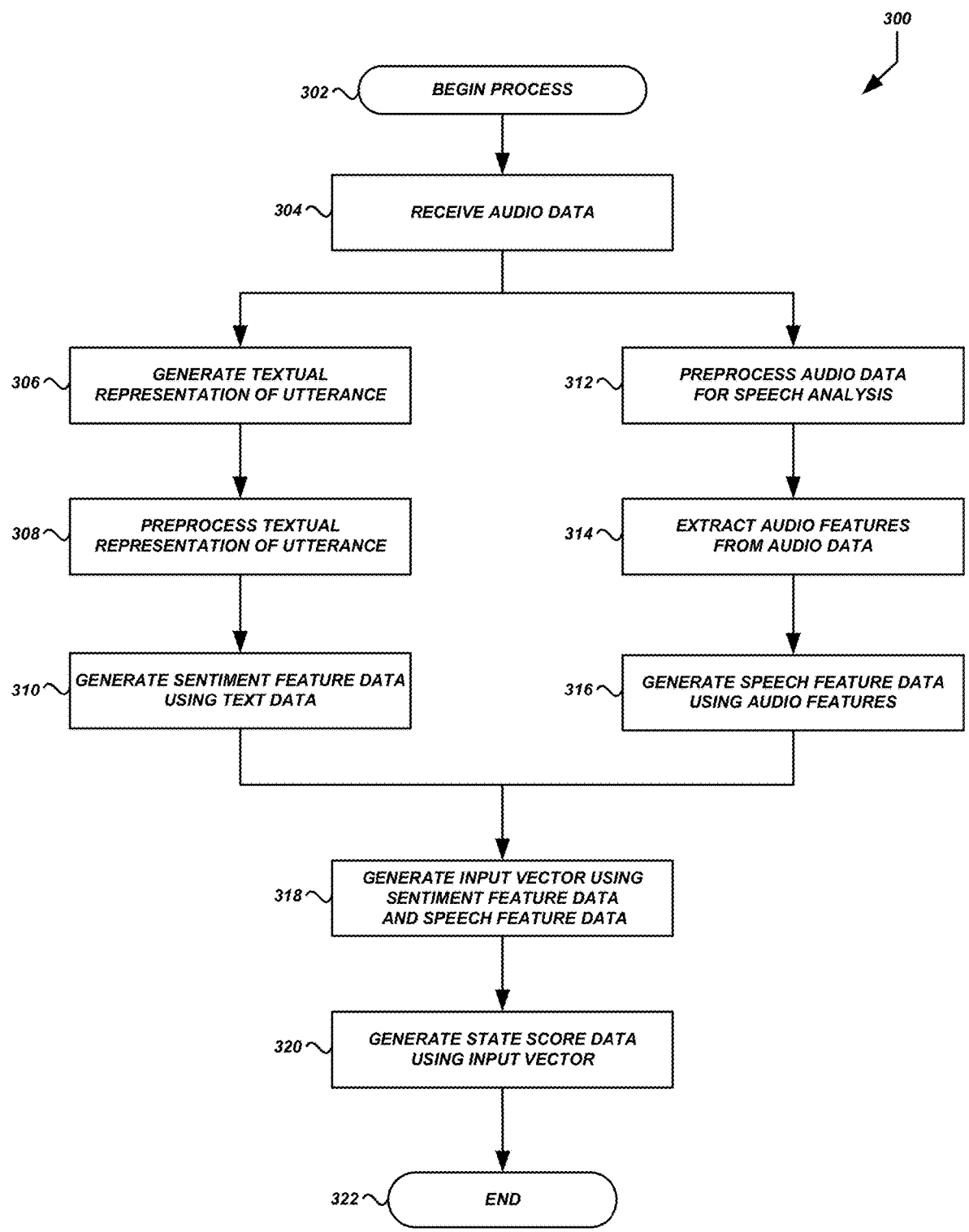
FIG. 3 is a flow diagram of an illustrative process for evaluating customer and/or agent state with respect to a customer contact according to some embodiments.

The contact manager 110 may request or otherwise obtain one or more state scores from the score generator 118 during the customer contact. To do so, the contact manager 110 may provide audio data, representing audio originating from the customer device 102 and/or the agent device 104, to one or more subsystems of the dynamic contact management system 100. For example, the contact manager 110 may provide audio data representing audio originating from the customer device 102 (and thus presumably representing utterances and of the customer) to the speech-to-text generator 112. The speech-to-text generator 112 may perform automatic speech recognition ("ASR") on the audio data, and produce text data representing utterances. The sentiment analyzer 114 may analyze the text data generated by the speech-to-text generator 112, and produce sentiment feature data representing a sentiment (or multiple sentiments) reflected by the words used in the utterances. The speech analyzer 116 may analyze audio features of the audio data, such as the pitch of a voice represented by the audio data, to produce speech feature data representing an emotion reflected by the speech. The dynamic score generator 118 may use the sentiment feature data and the speech feature data to generate a customer state score. The customer state score may represent a state of the customer, such as a degree of satisfaction or an emotional state. An example process for generating state scores from audio data is shown in FIG. 3 and described in greater detail below.

In some embodiments, the contact manager 110 may use the customer state score to update a graphical user interface that is presented on the agent device 104. For example, the contact manager 110 may request or otherwise obtain customer state scores on a continuous or periodic basis during the customer contact. The contact manager 110 may generate graphical user interface data that causes a visual summary of customer state scores to be displayed on the agent device 104.

Figure 2A:
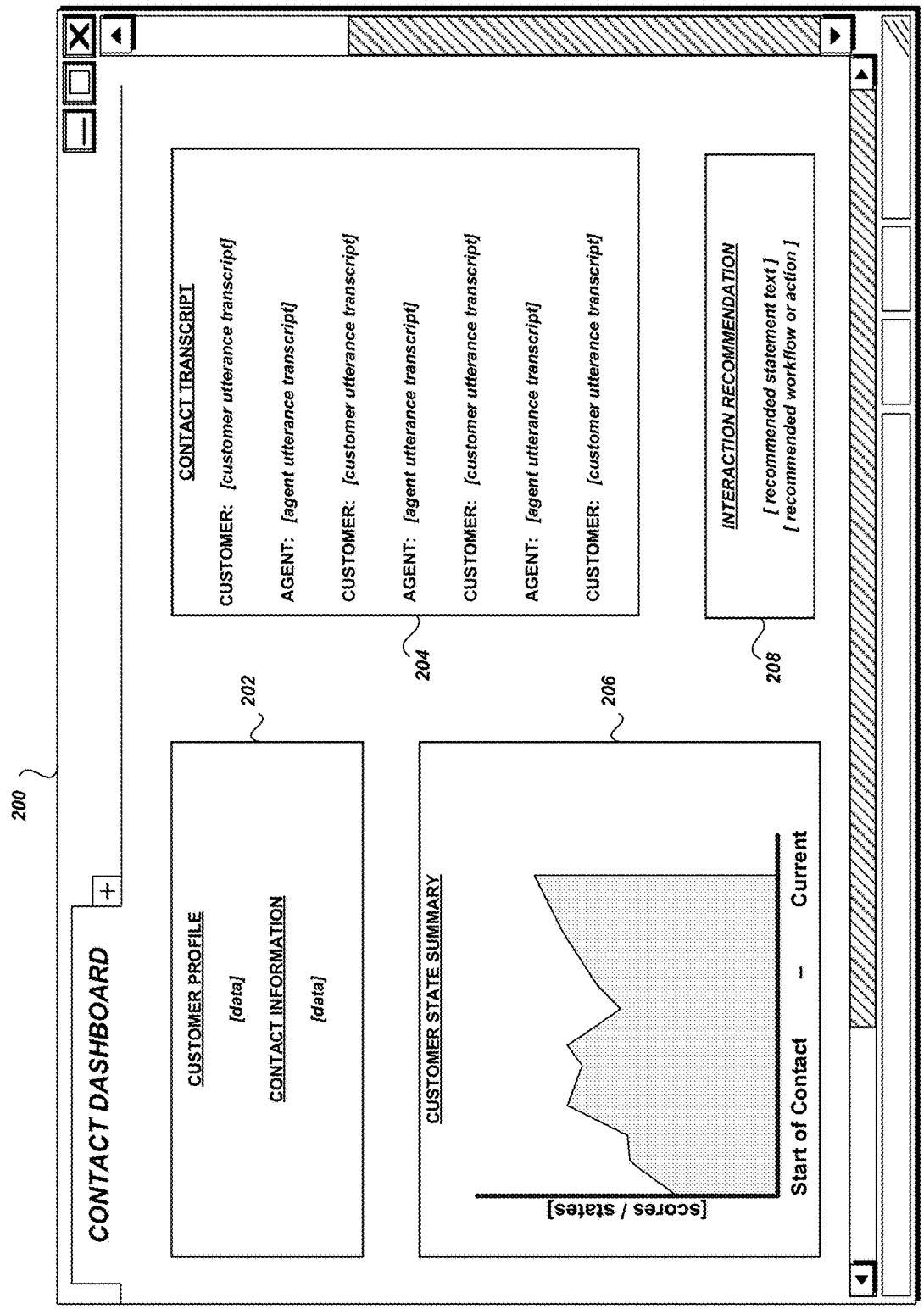
FIG. 2A is a diagram of an illustrative user interface for presenting information associated with a customer contact according to some embodiments.

FIG. 2A illustrates an example of a graphical user interface 200, also referred to herein as an interface 200 for simplicity, for presenting information associated with a customer contact. As shown, the interface 200 may include various sections for presenting contact-related information to an agent. For example, the interface 200 may include a contact information section 202 that provides information about the current customer contact (e.g., customer name, identification of issue, etc.). The interface 200 may also include a contact transcript section 204 that provides a transcript of the utterances made by the customer and/or the agent during the customer contact. The interface 200 may also include a customer state section 206 that summarizes the customer's state at the moment and/or over the course of the call. Illustratively, the customer state section 206 may be a graph that visually represents a correlation of customer state scores to time during the customer contact.

Figure 4:
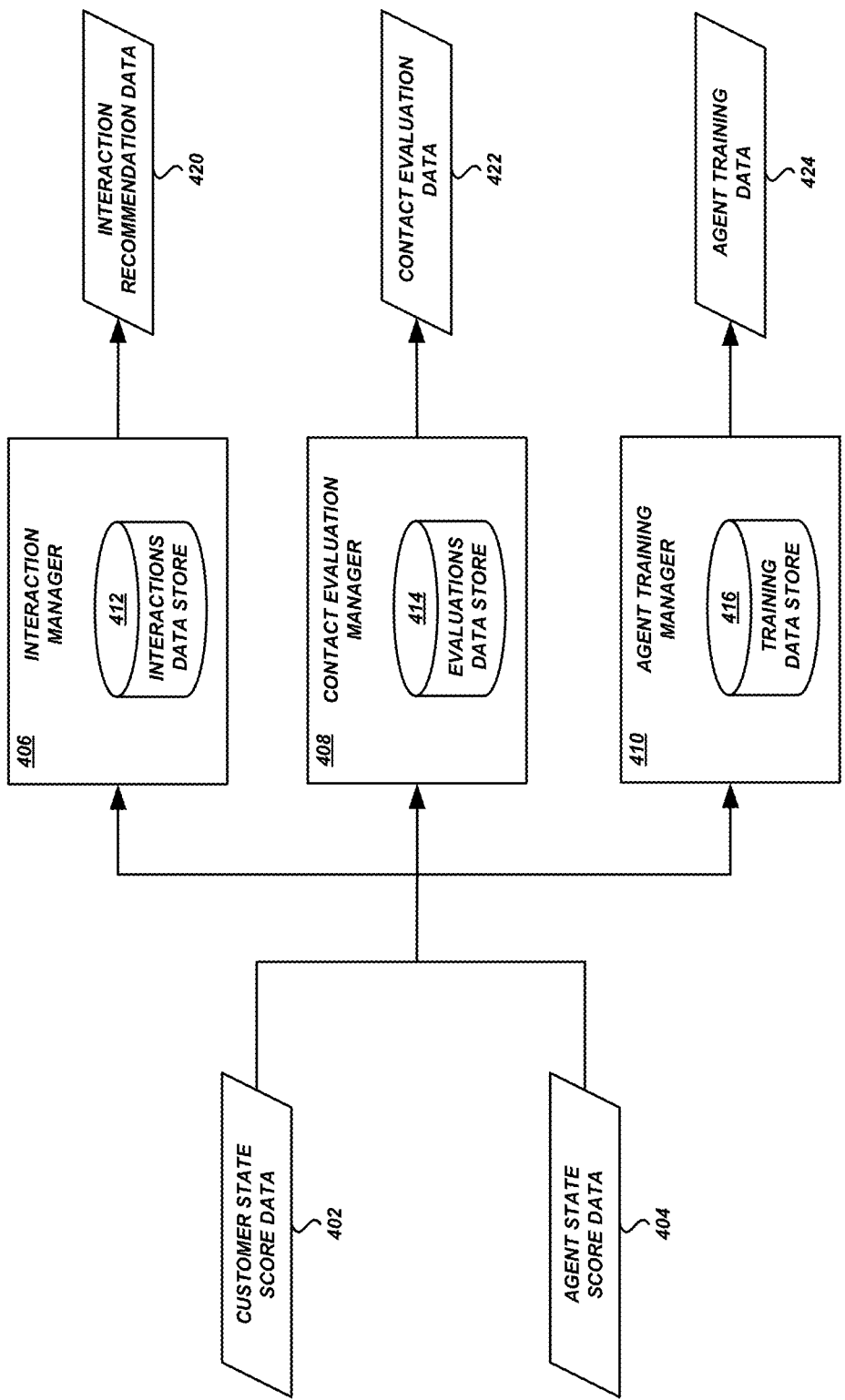
FIG. 4 is a block diagram of illustrative data flows during processing of customer state data and/or agent state data according to some embodiments.

In some embodiments, the contact manager 110 may use the customer state score to determine a question, comment, or other interaction that may be used by the agent to advance the customer contact toward a satisfactory resolution. For example, the contact manager 110 may analyze customer state scores using a model that correlates customer state scores to recommended interactions. The model may use, as input, one or more customer state scores, agent state scores, text data representing text of customer utterances, historical customer account data regarding prior customer contacts associated with this customer, other information, some combination thereof, etc. The contact manager 110 may continuously or periodically analyze the customer state scores and other input using the model. When a recommended interaction is identified, the contact manager 110 may generate graphical user interface data that causes a representation of the recommended interaction to be displayed on the agent device 104. An example process for generating interaction recommendations is shown in FIG. 4 and described in greater detail below.

As shown in FIG. 2A, the interface 200 may include a recommended interaction section 208 that presents information representing interactions identified by the contact manager 110. For example, the recommended interaction section 208 may present a question or comment that is recommended by the contact manager 110, such as a question intended to elicit from the customer information that may help the agent in improving the experience for the customer (e.g., as represented by a subsequent customer state score). As another example, the recommended interaction section 208 may present a workflow or action that is recommended by the contact manager 110, such as an offer of a discount or other concession, or a transfer of the contact to another agent.

In some embodiments, the contact manager 110 may use the customer state score to determine whether to invite the customer to provide an evaluation of the customer contact and/or the agent, or the contact manager 110 may use the customer state scores to determine which aspects of the customer contact and/or agent are to be evaluated. For example, the contact manager 110 may analyze customer state scores using a model that correlates customer state scores to recommended evaluation questions. The model may use, as input, one or more customer state scores, agent state scores, text data representing text of customer and/or agent utterances, historical customer account data regarding prior customer contacts associated with this customer, other information, some combination thereof, etc. The contact manager 110 may determine, using the model, which evaluation questions to invite the customer to answer, or whether to invite the customer to provide an evaluation at all. An example process for determining evaluation invitations is shown in FIG. 4 and described in greater detail below. The contact manager 110 or some other module or component of the dynamic contact management system 100 may receive an evaluation response from the customer device 102 (e.g., textual responses to questions, spoken responses, selections of pre-generated options for responding, etc.). The evaluation responses may be used in subsequent processes, such as agent evaluation.

Figure 2B:
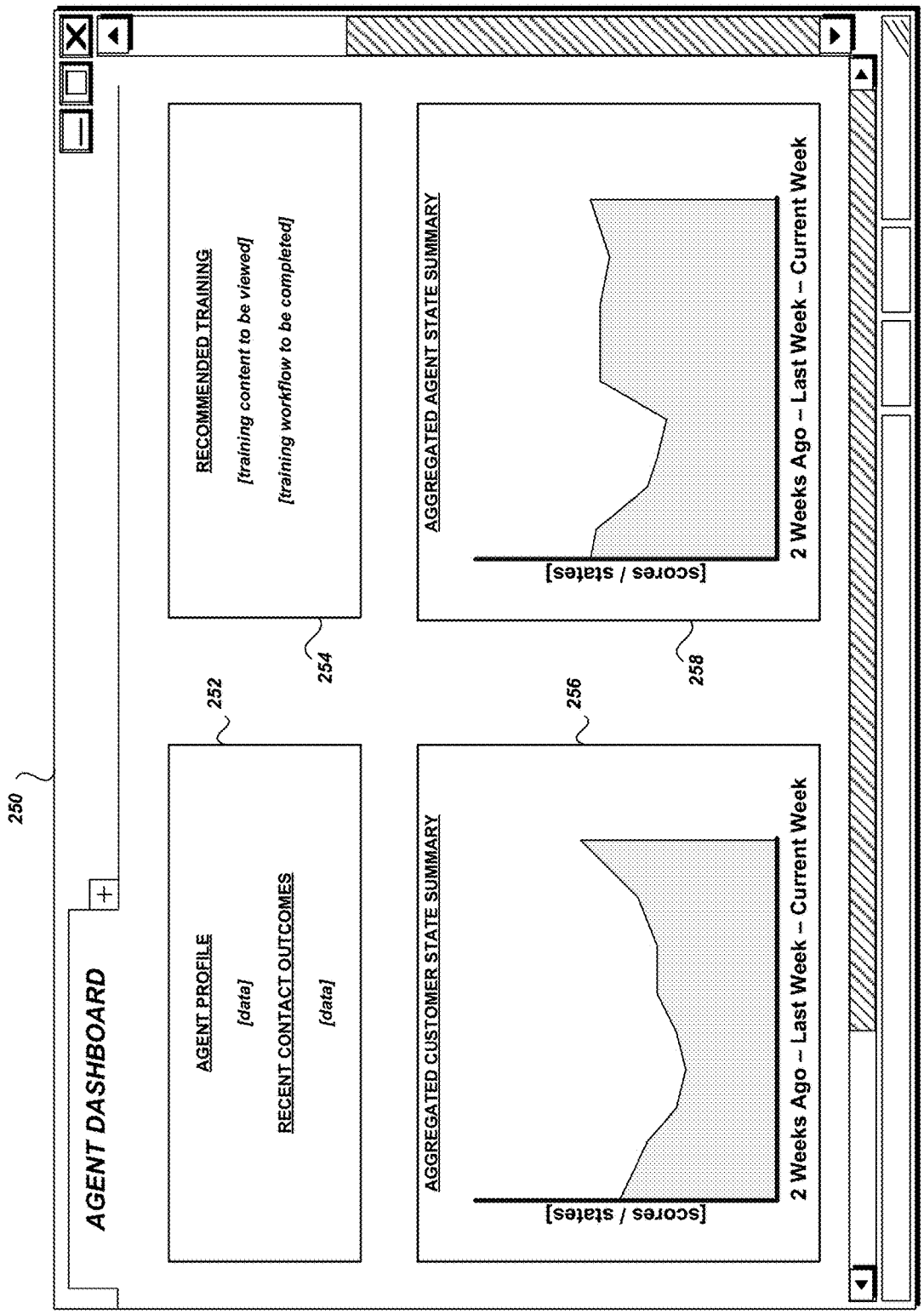
FIG. 2B is a diagram of an illustrative user interface for presenting information associated with agent performance according to some embodiments.

FIG. 2B illustrates an example of a graphical user interface 250, also referred to herein as an interface 250 for simplicity, for presenting information associated with agent performance according to some embodiments. As shown, the interface 250 may include various sections for presenting performance-related information to an agent. For example, the interface 250 may include an agent information section 252 that provides information about the current agent, such as profile information, a summary of outcomes of recent contacts handled by the agent, etc. The interface 250 may also include a recommended training section 254 that provides a listing of recommended training items (e.g., content to be viewed, workflows to be completed, etc.). The recommended training items may be determined by an agent training manager or some other system, as described in greater detail below. The interface 250 may also include an aggregated customer state section 256 that summarizes the state of customers for customer contacts handled by the agent over the course of time (e.g., the current day, week, month, etc.). Illustratively, the customer state section 256 may be a graph that visually represents a correlation of customer state scores to time. The interface 250 may also include an aggregated agent state section 258 that summarizes the state of the agent, as detected during customer contacts, over the course of time (e.g., the current day, week, month, etc.). Illustratively, the agent state section 258 may be a graph that visually represents a correlation of agent state scores to time.

Example Process for Generating State Scores

FIG. 3 is a flow diagram of an illustrative process 300 that may be executed by a dynamic contact management system 100 to generate state scores. The process 300 shown in FIG. 3 begins at block 302. The process 300 may begin in response to an event, such as when the dynamic contact management system 100 begins operation, or receives initiation of a customer contact. When the process 300 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 600 shown in FIG. 6 and described in greater detail below. For example, executable instructions for implementing the functionality of the contact manager 110, text-to-speech generator 112, sentiment analyzer 114, speech analyzer 116, and/or score generator 118 may be loaded into memory and executed by a processor. In some embodiments, the process 300 or portions thereof may be implemented on multiple processors, serially or in parallel.

At block 304, the contact manager 110 or some other module or component of the dynamic contact management system 100 can receive audio data associated with a current customer contact. The audio data may represent a voice of a customer and/or a voice of an agent. The audio data may be received as a continuous stream (e.g., in substantially real-time during a customer contact), or as a discrete set of audio data (e.g., audio data for a single utterance or set of utterances). For example, a customer may have an issue with a particular item, and the customer may use a telephone to call a phone number associated with the dynamic contact management system 100. The contact manager 110 can receive the phone call or be notified of receipt of the phone call. The contact manager 110 may extract metadata from or associated with the telephone call, prompt the customer for information regarding the contact, or perform some other operation to determine information regarding the customer and subject of the contact. The contact manager 110 may assign the customer contact to an agent account, and connect the phone call to an agent device 104 associated with the agent account. The contact manager 110 may then receive audio data from the customer device 102 and/or agent device 104 after notifying and receiving consent from the appropriate parties to receive the audio data. Although the example described above relates to a customer contact that includes a telephone call, in some embodiments other types of conversations may be processed. For example, a conversation may be or include a video and/or audio chat from which audio data regarding utterances may be obtained.

At block 306, the speech-to-text generator 112 or some other module or component of the dynamic contact management system 100 can generate a textual representation of the audio data. In some embodiments, the speech-to-text generator 112 may use ASR processing to generate text data representing utterances of the customer and/or agent. For example, the speech-to-text generator 112 may identify acoustic features in the audio data, and use an acoustic model to generate hypotheses regarding which words or subword units (e.g., phonemes) correspond to the acoustic features identified in the audio data. The speech-to-text generator 112 may then use a language model to determine which of the hypotheses generated using the acoustic model is most likely the correct textual representation (e.g., transcription) of an utterance based on lexical features of the language in which the utterance is spoken.

At block 308, the sentiment analyzer 114 or some other module or component of the dynamic contact management system 100 can preprocess the text data generated by the speech-to-text generator 112 for use in classifying a sentiment. In some embodiments, the preprocessing may include tokenizing the text data into a collection of tokens. For example, text data may represent sentences, phrases, or individual words spoken by a customer or agent. Analyzing text data on a word-by-word basis to detect sentiment may not produce desired results, particularly when groups of words are being used as a single conceptual unit. Tokenizing the text data can help to identify individual conceptual units as tokens to be analyzed for sentiment, rather than analyzing text on a word-by-word basis for sentiment.

In some embodiments, the preprocessing may include normalizing the text data. Normalization of the text data can include modifying words into standard forms that can be processed in a consistent manner, regardless of which person spoke the utterance from which the text data was generated, the grammatical errors and idiosyncrasies introduced by that person, etc. Normalizing text may include expanding contractions and abbreviations of words or phrases, and other short-hand. For example, the word "don't" may be expanded by replacing it with two separate words "do" and "not." As another example, the abbreviation "omg" may be expanded by replacing it with three separate words: "oh," "my," and "god."

In some embodiments, the preprocessing may include lemmatizing he normalized text generated above (or the raw, un-normalized text data). Generally described, lemmatization is a process of grouping together different inflected forms of a word so they can be treated as a single item. For example, different inflected forms of a lemma may each be treated as an instance of the lemma rather than an instance of a separate word corresponding to one of the inflected forms. Thus, the words "walk," "walked," "walks," and "walking" may each be replaced by or otherwise counted as four instances of the lemma "walk" rather than separate instances of "walk," "walked," "walks," and "walking." In some embodiments, lemmatizing text, which may also be referred to as "stemming" text, may include using an algorithm such as the Lovins stemmer, Porter stemmer, or Paice stemmer to identify the lemma that corresponds to the various inflected forms of the lemma used in the user-generated text. Those inflected forms may then be replaced by the lemma, or tagged such that the lemma can be used during the subsequent sentiment analysis process At block 310, the sentiment analyzer 114 or some other module or component of the dynamic contact management system 100 can generate sentiment feature data using the preprocessed text data generated above (or directly using text data generated by the speech-to-text generator 112 or otherwise received by the sentiment analyzer 114). In some embodiments, the sentiment analyzer 114 may use sentiment analysis techniques, such as "bag of words" analysis, latent semantic analysis ("LSA"), and/or support vector machines ("SVM"), to process input text data and determine a sentiment expressed in an utterance represented by the input text data. In "bag of words" analysis, a scoring algorithm can be used which assigns positive and negative weights to various words or phrases, and then analyzes input text data for the presence of those words or phrases to score the input. A Bayesian bag of words model may be used which estimates a probability, based on a known data set, that a particular input is in one of two corpuses (e.g., "positive" utterances or "negative" utterances). For example, a first set of input text data representing a first utterance made during a customer contact may indicate that a proposed resolution is acceptable, or that the contact is otherwise likely to be satisfactorily resolved. The first utterance may be determined to express a positive sentiment about the contact. A second set of input text data representing a second utterance made during a customer contact may indicate that a proposed resolution is not acceptable, or that the contact is otherwise not likely to be satisfactorily resolved. The second utterance may be determined to express a negative sentiment about the contact.

LSA may be used to describe relationships between parts of a set of text input data by assuming that words that are close in meaning or sentiment will occur in similar sections of text input data. For example, a transcript of a customer contact may be analyzed to determine the occurrence of words in sections of the transcript (e.g., in individual utterances or individual time periods of the customer contact). Based on this analysis, a matrix of word occurrences may be constructed. Singular Value Decomposition ("SVD") may be used to reduce the matrix while preserving textual relationships. The angle between vectors described by various terms may be analyzed, and terms with vector angles closer to zero are more closely related (e.g., express similar sentiments) than other terms. In this way, sentiments may be identified in portions of the customer contact based on the occurrence of multiple words having similar sentiments.

The sentiment analysis techniques described above are illustrative only, and are not intended to be limiting. In some embodiments, other techniques (e.g., other specific sentiment analysis algorithms, general machine learning approaches, etc.) may also or alternatively be used.

The sentiment feature data generated by the sentiment analyzer 114 may represent a classification of a sentiment that most likely corresponds to the text data. For example, the sentiment feature data may include a particular value, such as an index that corresponds to a particular sentiment within a range of sentiments. In some embodiments, the sentiment feature data may include multiple individual values, such as a separate value for each of multiple sentiments. For example, the sentiment analyzer 114 may be configured to detect n different sentiments, where n is an integer. The sentiment feature data may therefore include n different values, with each value being a floating-point number representing a degree to which a different sentiment of the n different sentiments corresponds to the text data.

At block 312, the speech analyzer 116 or some other module or component of the dynamic contact management system 100 can preprocess the audio data for use in generating speech feature data. For example, the speech analyzer 116 may apply various filters to the audio data, such as a finite impulse response ("FIR") filter. The signal may then be windowed into a succession of frames (e.g., 15 ms frames, 25 ms frames, 50 ms frames, etc.) that are to be processed individually.

In some embodiments, preprocessing the audio data may include determining demographic information regarding a person whose voice is represented by the audio data. For example, subsequent speech analysis processes may be performed using different models or different methods altogether depending upon the gender of the person whose voice is represented in the audio data. The speech analyzer 116 may use a classifier to determine the gender, or access data associated with the customer account and/or agent account to determine the gender. In some embodiments, preprocessing the audio data may include separating audio data representing the voice of the customer from audio data representing the voice of the agent. For example, the process 300 may be performed to generate separate state scores for customers and agents, or only for customers. In such cases, identifying and isolating the individual voices may be performed.

At block 314, the speech analyzer 116 or some other module or component of the dynamic contact management system 100 can extract audio features from the frames of audio data generated above. In some embodiments, the speech analyzer 116 may extract or otherwise generate pitch metrics, Mel-frequency cepstrum coefficients ("MFCCs"), linear frequency cepstrum coefficients ("LFCCs"), linear prediction coefficients ("LPCs"), reflection coefficients ("RCs"), or linear prediction cepstrum coefficients ("LPCCs").

For example, the speech analyzer 116 may compute pitch metrics as the features of the voice represented by the audio data. The speech analyzer 116 may measure the pitch in Hz for a series of samples in a frame of audio data. The speech analyzer 116 may then compute various statistics, such as the mean, median, variance, maximum, and/or minimum for the pitch measurements and/or the derivatives of the pitch measurements for the samples taken for the frame. The speech analyzer 116 may generate a feature vector for the frame using these statistics, such as a feature vector that includes a separate dimension for each of the computed statistics. The speech analyzer 116 may include additional or alternative information in the feature vector, such as the average energies of voiced and unvoiced speech, and the speaking rate (e.g., the inverse of the average length of the voiced part of the utterance in the frame). Illustratively, the pitch-based feature vector in one specific, non-limiting embodiment may be a 13-dimensional feature vector.

As another example, the speech analyzer 116 may compute MFCCs as the features of the voice represented by the audio data. The speech analyzer 116 may compute a separate MFCC for each frame of audio data. The speech analyzer 116 may compute an absolute value of a short-time Fourier transform ("STFT"), warp the absolute value to a Mel-frequency scale, compute the discrete cosine transform ("DCT") of the log-Mel-spectrum, and return the first 13 components. For each of the corresponding coefficients and their derivatives, the speech analyzer 116 may compute various statistics, such as a mean, variance, maximum, and minimum across all frames. The speech analyzer 116 may generate a feature vector for the frame using these statistics, such as a feature vector that includes a separate dimension for each of the computed statistics. The speech analyzer 116 may also calculate the mean, variance, maximum, and minimum of the mean of each coefficient and its derivative. The speech analyzer 116 may include this additional computed information to in the feature vector. Illustratively, the MFCC-based feature vector in one specific, non-limiting embodiment may be 112-dimensional.

At block 316, the speech analyzer 116 or some other module or component of the dynamic contact management system 100 can generate speech feature data using the feature vectors generated above. In some embodiments, the speech analyzer 116 can analyze the feature vectors with respect to a model trained to classify the feature vectors into particular classifications, such as classifications associated with particular emotions. Illustratively, the model may be a k-means clustering trained model, a support vector machine ("SVM") trained model, or some other classification model. In some embodiments, the speech analyzer 116 may use different models in different contexts. In this way, the speech analyzer 116 may accurately determine speech features (e.g., emotion classifications) across different contexts, when a general model may not accurately determine speech features in specific contexts. The different models may be designed for analyzing speech that has different speech characteristics, such as speaking rate, prosody, pitch, volume, language, dialect, accent, some combination thereof, etc. For example, the speech analyzer 116 may access data regarding the gender of a speaker (e.g., data associated with a profile of a customer or agent, modelling applied to predict the gender of a speaker, etc.). The speech analyzer may use a first model if the person whose voice is represented by the audio data is a male, and a second model if the person whose voice is represented by the audio data is a female. As another example, the speech analyzer 116 may access data regarding a geographic location of a speaker. The speech analyzer 116 may select a model tailored to speech characteristics of speakers (e.g., accent, prosody, etc.) in the geographic location.

The model may differentiate between a set of emotions, such as anger, boredom, disgust, anxiety, happiness, sadness, and neutral. In some embodiments, the model may different between "opposing" emotional states from a set of "opposing" emotion pairs, such as despair/elation, happiness/sadness, interest/boredom, shame/pride, hot-anger/elation, and cold-anger/sadness.

The speech feature data generated by the speech analyzer 116 may represent a classification of an emotion that most likely corresponds to the voice represented by the audio data. For example, the speech feature data may include a particular value, such as an index that corresponds to a particular emotion within a range of emotions. In some embodiments, the speech feature data may include multiple individual values, such as a separate value for each of multiple emotions. For example, the speech analyzer 116 may be configured to detect n different emotions, where n is an integer that corresponds to the number of emotions detectible by the speech analyzer 116, or some subset thereof. The speech feature data may therefore include n different values, with each value representing a degree to which a different emotion of the n different emotions corresponds to the voice represented by the audio data. The specific values may represent likelihoods that the speech is representative of corresponding emotions. For example, a first value that corresponds to "anger" may be a floating-point value between 0.0 and 1.0, where a lower value indicates a lower likelihood that the speaker of the analyzed speech is angry, and a higher value indicates a higher likelihood that the speaker of the analyzed speech is angry. A second value that corresponds to "happiness" may be a different floating-point value between 0.0 and 1.0. The entire set of values may include a separate value for each detectible emotion, or it may include a value for some subset thereof (e.g., the n most likely emotions). In some embodiments, the values may be normalized such that they add up to some predetermined number, such as 1.0, and may therefore be directly compared (e.g., a value of 0.6 for a particular emotion means that emotion is twice as likely as an emotion with a value of 0.3).

In some embodiments, the speech analyzer 116 may also or alternatively generate speech feature data representing a manner in which an utterance (or group of utterances) was made. For example, the speech feature data may indicate whether there are pauses in the utterance(s), the absolute length of pauses, the relative length of pauses with respect to an expected length of a pause, etc. Illustratively, pauses that last longer than average or otherwise expected may indicate stress or unhappiness on the part of the person making the utterances. As another example, the speech feature data may indicate a speed or rate at which the utterance was made, in absolute terms (e.g., words per unit of time) and/or in relative terms (e.g., faster or slower than expected). Illustratively, a speed which exceeds or falls below certain thresholds, or which deviates from what is expected by a statistically significant degree, may indicate excitement or stress on the part of the person making the utterances.

The examples of speech feature data described herein are illustrative only, and are not intended to be limiting. In some embodiments, speech feature data may represent fewer, additional, and/or alternative aspects of speech that may be used to determine a state of the speaker.

At block 318, the score generator 118 or some other module or component of the dynamic contact management system 100 can generate an input vector for use in generating a state score. The input vector may include the sentiment feature data or data derived therefrom. The input vector may also include the speech feature data or data derived therefrom. In some embodiments, the input vector may include additional information, such as information associated with the customer account, agent account, customer contact, etc.

At block 320, the score generator 118 or some other module or component of the dynamic contact management system 100 can generate state score data, such as data representing a state score or a vector of state scores, using the input vector generated above. For example, the state score data may be a value that represents a degree of satisfaction of a speaker. Illustratively, the value may be a floating-point value between 0.0 and 1.0, where a higher value indicates a greater degree of satisfaction. In this way, state scores may be analyzed over time to determine trends, rates of change, and the like. In some embodiments, the state score data generated by the score generator 118 may represent a classification, such as an emotion, that most likely corresponds to the voice represented by the audio data. In this case, the use of sentiment feature data from the sentiment analyzer 114 allows for a refinement to the emotion classification determined by the speech analyzer 116. For example, a state score may be a particular value, such as an index that corresponds to a particular emotion within a range of sentiments, or a real number value (e.g., floating-point value) within a range of values, and the range of values corresponds to the range of sentiments. In some embodiments, the score generator 118 may generate state score data including multiple individual values, such as an output vector with a separate floating-point value for each of multiple classifications (e.g., emotions). For example, the score generator 118 may be configured to jointly classify sentiment feature data and speech feature data into n different emotions, where n is an integer. The state score data may therefore include n different floating-point values, with each floating-point value representing a degree to which a different emotion of the n different emotions corresponds to the voice represented by the audio data.

The score generator 118 may generate state score data using a model or a set of rules that correlates input vector data (e.g., sentiment feature data, speech feature data, etc.) to state scores. For example, the score generator 118 may use a model that is trained using training data representing sentiment feature data and speech feature data generated for completed customer contacts. The training data inputs may be mapped to outputs, such as data regarding a customer's assessment of their customer experience, which may be quantified as a state score. The model may then be trained using a machine learning algorithm that adjusts the parameters of the model to more accurately predict the state score for a given set of inputs.

The score generator 118 may use a set of rules instead of—or in addition to—a model to determine a state score from sentiment feature data and speech feature data. In some embodiments, the score generator 118 may use the speech feature data as a confirmation or "confidence boost" for a determination made using the sentiment feature data. For example, if the sentiment feature data indicates that a speaker (e.g., a customer or agent) is expressing a particular sentiment or emotion, and the speech feature data also indicates that the speaker is expressing the same or a similar sentiment or emotion, then the score generator 118 may increase the state score with respect to that particular emotion. In some embodiments, the score generator 118 may analyze speech feature data for particular features that may correspond to particular state classification, or which provide additional confidence in classifications based on the sentiment feature data. For example, a state score may be increased, or set to a value indicative of a degree of frustration, based on the pauses in the speech of the speaker (e.g., quantity of pauses, length of pauses, etc.).

The process 300 may terminate at block 322. The state score data generated using the process 300 may be provided to a state score consumer, such as the scores data store 120 for storage, agent device 104 for display, contact manager 110 for use in subsequent processes, etc. In some embodiments, portions of the process 300 may be performed in a different order than described above and shown in FIG. 3. For example, FIG. 3 illustrates blocks 306, 308, and 310 being performed in parallel or asynchronously with blocks 312, 314, and 316. However, in some embodiments, these blocks may all be performed serially, one after another, in a predetermined or dynamically determined order. Some other portions of the process 300 may be performed in parallel or asynchronously rather than serially or synchronously as shown. Some portions of the process 300 may be omitted, and/or additional operations may be performed.

Example Contact Manger Processing

FIG. 4 illustrates data flows and interactions between various components of a dynamic contact management system 100 or some other system according to some embodiments. As shown, the contact manager may include an interaction manager 406, a contact evaluation generator 408, and/or an agent training manager 410.

The interaction manager 406 may receive, as input, one or more state scores and generate, as output, interaction recommendation data 420. In some embodiments, the interaction manager 406 may analyze a most-recently generated customer state score 402 with respect to a model or a set of rules that correlates state scores to recommended interactions. If the customer state score 402 satisfies a threshold or matches some other criterion, alone or in combination with other data, then the interaction manager 406 may identify a recommended interaction. For example, if the customer state score 402 is indicative of a particular emotional state, such as anger or despair, then the interaction manager 406 may determine that a particular interaction is to be recommended to the agent handling the customer contact, such as a statement or question designed to elicit a response from the customer that improves the customer's emotional state or otherwise improves the likelihood of a positive resolution. The recommended interaction data 420 may represent this interaction (e.g., the recommended interaction data 420 may represent a string of words to be spoken by the agent). The recommended interaction data 420 may be predetermined data (e.g., curated data provided by system administrators) that is stored in and retrieved from an interactions data store 412 accessible to the interaction manager 406. Illustratively, the interactions data store 412 may include data representing a set of predetermined interactions designed for particular purposes and associated with customer state scores or otherwise indexed such that they can be obtained based on analysis of customer state scores. In some embodiments, rather than retrieving recommended interaction data 420 from a data store, the interaction manager 406 may generate the recommended interaction data 420 directly from the input (e.g., using a natural language generation subsystem), or the interaction manager 406 may be preprogrammed with the recommended interactions.

In some embodiments, the interaction manager 406 may use multiple customer state scores 402, such as a set of the n most recently generated customer state scores 402 for the current customer contact. Therefore, the interaction manager 406 can use a model or set of rules that correlates recommended interactions with changes in customer state scores over time. In some embodiments, the interaction manager 406 may also use one or more agent state scores 404 as input, and may therefore use a model or set of rules that correlates recommended interactions with an agent's emotional state in addition to the customer's emotional state.

The contact evaluation generator 408 may receive, as input, one or more state scores and generate, as output, contact evaluation data 422. In some embodiments, the contact evaluation generator 408 may analyze a last-determined customer state score 402 for a customer contact with respect to a model or a set of rules that correlates state scores to contact evaluation questions. If the last-determined customer state score 402 satisfies a threshold or matches some other criterion, alone or in combination with other data, then the contact evaluation generator 408 may identify a contact evaluation question to be presented to the customer, or the contact evaluation generator 408 may determine that no evaluation question is to be presented. For example, if the customer state score 402 is indicative of a particular emotional state, such as happiness or elation, but the issue of the customer contact has not been resolved, then the contact evaluation generator 408 may determine that a particular evaluation question about the nature of the issue is to be presented to the customer. As another example, if the customer state score 402 is indicative of an emotional state of anger or despair, but the issue of the customer contact has not been resolved, then the contact evaluation generator 408 may determine that a particular evaluation question about the service provided by the agent is to be presented to the customer. Contact evaluation data 422 may be stored in a contact evaluations data store 414 accessible to the interaction manager 406. Illustratively, the contact evaluations data store 414 may include data representing a set of evaluations designed for particular purposes. In some embodiments, rather than retrieving contact evaluation data 422 from a data store, the contact evaluation generator 408 may generate the contact evaluation data 422 directly from the input (e.g., using a natural language generation subsystem), or may be pre-programmed with the contact evaluation questions.

In some embodiments, the contact evaluation generator 408 may use multiple customer state scores 402, such as a set of the n most recently generated customer state scores 402 for the current customer contact, or all customer state scores 402 for the customer contact. Therefore, the contact evaluation generator 408 can use a model or set of rules that correlates evaluation questions with, e.g., mean or median customer state scores over the entire customer contact. In some embodiments, the contact evaluation generator 408 may also use one or more agent state scores 404 as input, and may therefore use a model or set of rules that correlates evaluation questions with an agent's emotional state in addition to the customer's emotional state.

The agent training manager 410 may receive, as input, one or more state scores and generate, as output, agent training data 424. In some embodiments, the agent training manager 410 may analyze agent state score data 404, customer state score data 402, contact evaluation response data from customers, other data, or some combination thereof with respect to a model or a set of rules that correlates the analyzed data to recommended agent training. The agent training may be or include content, interactive courses, coaching, or the like. For example, if an agent state score 404 for an agent (and/or a customer state score 402 for a customer with whom the agent has interacted) is indicative of a particular emotional state (e.g., anger or despair), then the agent training manager 410 may determine that a particular training workflow is to be recommended. The agent training data 424 may represent this recommended training workflow (e.g., the agent training data 424 may represent a title or an identifier for the recommended training workflow to be completed by the agent). The agent training data 424 may be predetermined data (e.g., curated data provided by system administrators) that is stored in and retrieved from a training data store 416 accessible to the agent training manager 410. Illustratively, the training data store 416 may include data representing a set of predetermined training workflows or content designed for particular purposes and associated with agent and/or customer state scores.

In some embodiments, the agent training manager 410 may use multiple agent state scores 404 and/or customer state scores 402, such as a set of the n most recently generated agent state scores 404 for a particular agent and the n most recently generated customer state scores 402 for customer contacts handled by the agent. Therefore, the agent training manager 410 can use a model or set of rules that correlates recommended interactions with changes in state scores over time.

Example Distribution of Contacts Using State Scores

Figure 5:
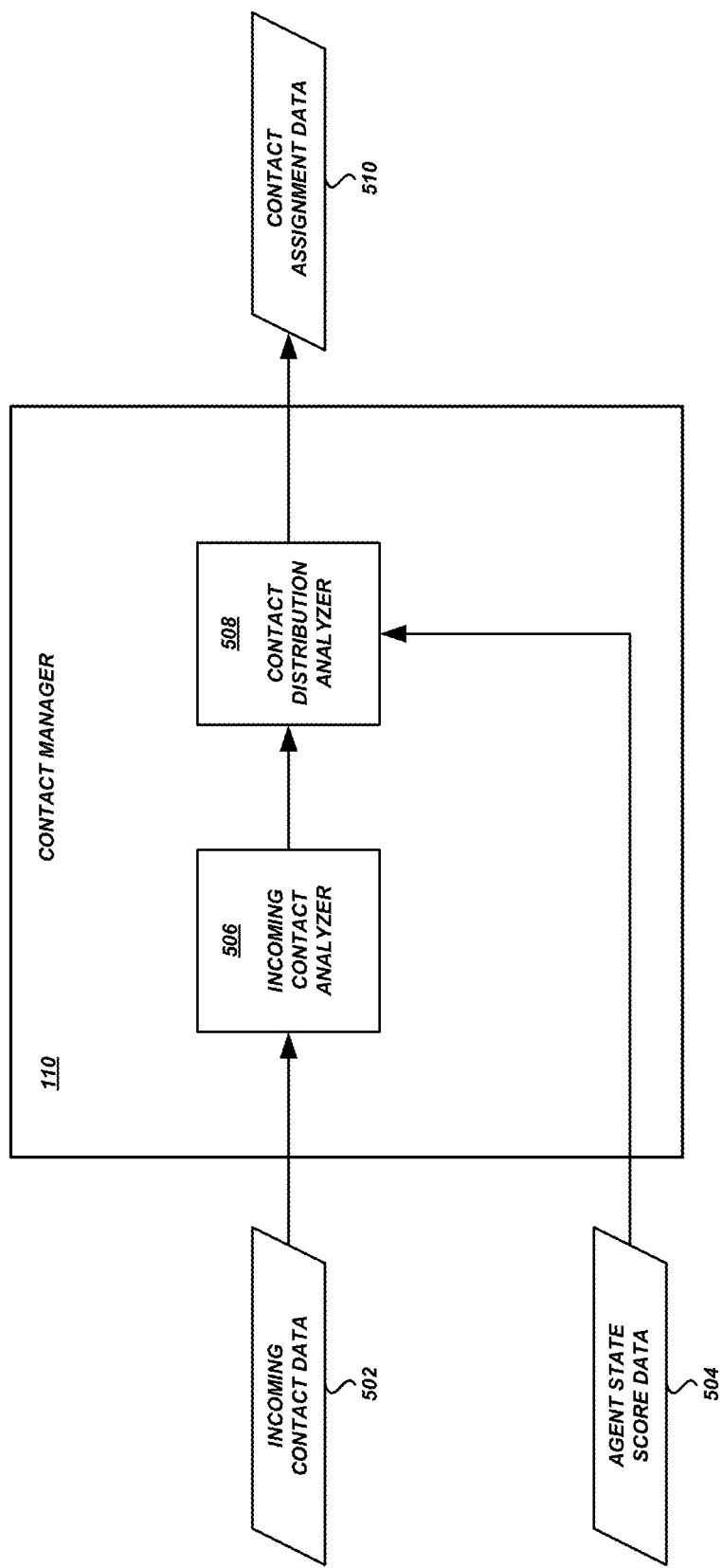
FIG. 5 is a block diagram of an illustrative data flows during customer contact distribution according to some embodiments.

FIG. 5 illustrates data flows and interactions between various components of an example contact manger 110 according to some embodiments. As shown, the contact manger 110 may include an incoming contact analyzer 506 and/or a contact distribution analyzer 508. Advantageously, the contact manger 110 can intelligently assign incoming contacts to particular agents based on an analysis of the state of the individual agents, as represented by the agent scores 504. Thus, an agent who is exhibiting signs of dissatisfaction or stress can be given a break or assigned to contacts predicted to be less stressful for a period of time, or until the agent's state improves.

The incoming contact analyzer 506 may receive, as input, incoming contact data 502 and generate, as output, contact classification data. The incoming contact analyzer 506 may analyze incoming contact data 502 with respect to a model or a set of rules that correlates features of incoming contact data 502 to a contact classification. For example, the incoming contact analyzer 506 may determine an expected level of difficulty for an incoming customer contact based on information regarding, e.g., the customer associated with the customer contact, historical information regarding prior customer contacts involving the customer, the issue that gave rise to the customer contact, an expected amount of time to resolve the contact, other information, some combination thereof, etc.

The contact distribution analyzer 508 may receive, as input, agent state data 504 associated with one or more customer contacts that one or more agents have processed, and contact classification data generated by the incoming contact analyzer 506 for a particular incoming contact or set of incoming contacts. The contact distribution analyzer 508 may analyze the agent state score data 504 for one or more agents and contact classification data with respect to a model or a set of rules. As a result of the analysis of the agent state score data 504 and contact classification data, the contact distribution analyzer 508 can generate contact assignment data 510 that causes agents to be assigned to customer contacts (e.g., the contact distribution analyzer 508 causes a phone call or other conversation from a customer device 102 to be connected to an agent device 104). For example, if one or more agent state scores 504 for an agent indicate that the agent is exhibiting signs of stress or dissatisfaction, or that the agent's state has been trending toward stress or dissatisfaction, then the contact distribution analyzer 508 may assign the agent to a contact that has been classified as having a relatively low level of difficulty. The contact distribution analyzer 508 may continue to assign the agent to relatively low-difficulty contacts for a predetermined or dynamically determine period of time, or until some other criteria is satisfied, such as a threshold being satisfied by an agent state score 504 or trend of agent state scores 504 over time. As another example, if an agent is exhibiting signs of stress as indicated by agent state scores 504 satisfying some criterion, the contact distribution analyzer 508 may not assign any contacts to the agent for a predetermined or dynamically determined period of time to give the agent a break. As a further example, if an agent is exhibiting signs of stress as indicated by agent state scores 504 satisfying some criterion, the contact distribution analyzer 508 may assign the agent to receiving training, or the contact distribution analyzer 508 may generate a notification to a manger.

Example Computing Device

Figure 6:
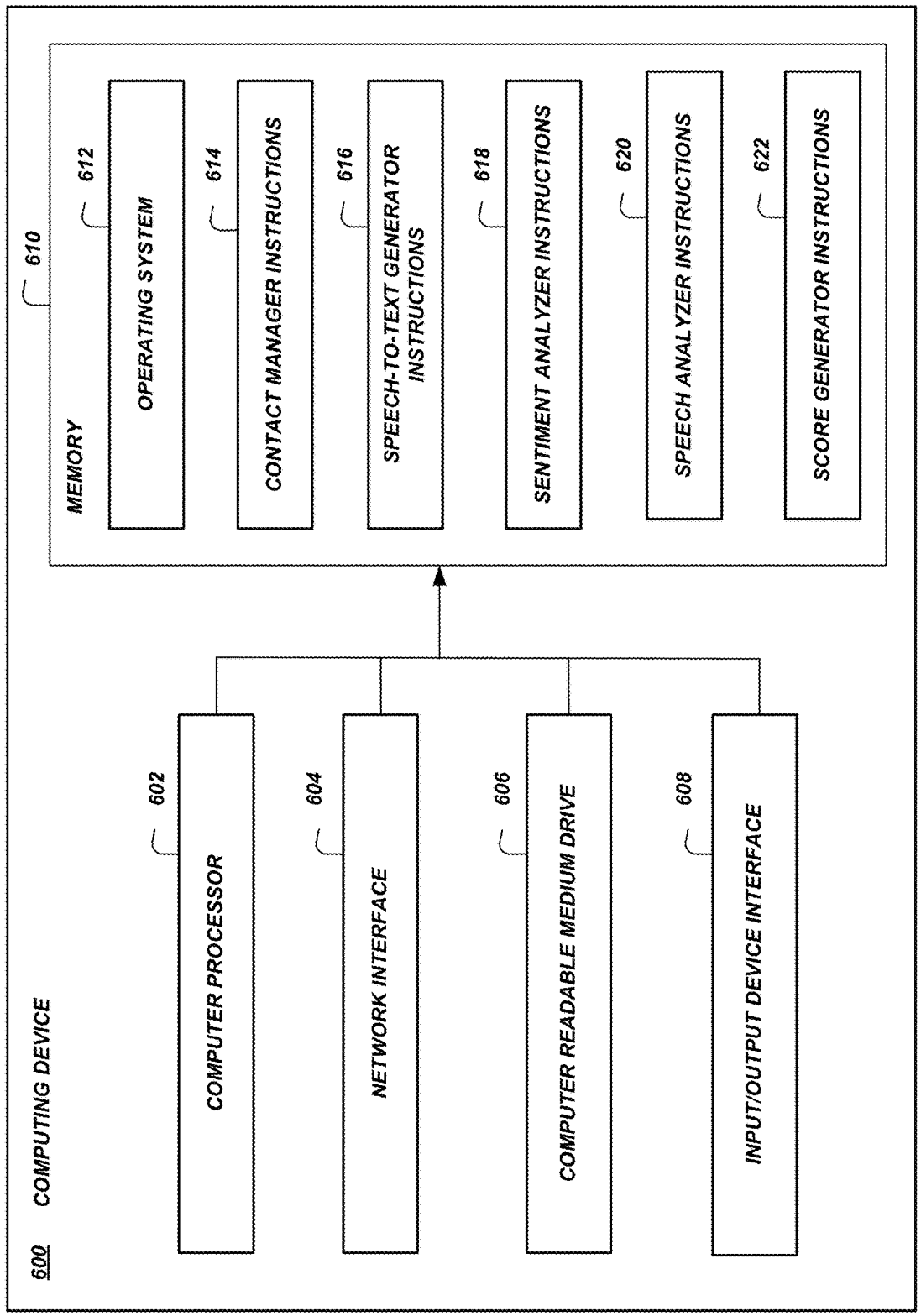
FIG. 6 is a block diagram illustrating components of a computing device configured to execute processes for dynamic state evaluation and contact processing according to some embodiments.

FIG. 6 illustrates the various components of an example computing device 600 configured to implement some or all of the functionality of the dynamic contact management system 100. In some embodiments, as shown, the computing device 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer-readable media.

The computer readable memory 610 may include computer program instructions that one or more computer processors 602 execute in order to implement one or more embodiments. The computer readable memory 610 can store an operating system 612 that provides computer program instructions for use by the computer processor(s) 602 in the general administration and operation of the computing device 600. In some embodiments, the computer readable memory 610 can further include computer program instructions and other information for implementing aspects of the present disclosure. For example, in one embodiment, the computer-readable memory 610 may include contact manager instructions 614 for implementing features of the contact manager 110, speech-to-text generator instructions 616 for implementing features of the speech-to-text generator 112, sentiment analyzer instructions 618 for implementing features of the sentiment analyzer 114, speech analyzer instructions 620 for implementing features of the speech analyzer 116, and/or score generator instructions 622 for implementing features of the score generator 118.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more processors in communication with the computer-readable memory and configured by the executable instructions to at least:
      receive a request from a customer device to begin a customer service contact;
      determine a contact classification for the customer service contact based at least partly on contact attribute data regarding the customer service contact;
      obtain an agent state score representing a sentiment of an agent based on one or more prior customer service contacts assigned to the agent;
      prior to beginning the customer service contact, determine to assign the customer service contact to the agent based at least partly on the contact classification and the agent state score;
      receive audio data from the customer device, wherein the audio data represents an utterance during the customer service contact;
      generate text data representing the utterance using the audio data;
      generate sentiment feature data using the text data, wherein the sentiment feature data represents a sentiment associated with the utterance;
      generate speech feature data using the audio data, wherein the speech feature data represents an emotion associated with the utterance;
      generate a satisfaction score using the sentiment feature data, the speech feature data, and a model trained to predict a degree of satisfaction based at least partly on a sentiment feature and a speech feature;
      determine a customer service contact interaction based at least partly on an expected effect on the satisfaction score;
      generate graphical user interface data using the satisfaction score and a plurality of previously-generated satisfaction scores, wherein the graphical user interface data represents the customer service contact interaction and a visual summarization of satisfaction scores with respect to time;
      send the graphical user interface data to an agent device associated with the customer service contact;
      generate, using the satisfaction score, customer service contact evaluation data representing one or more evaluation questions;
      send the customer service contact evaluation data to the customer;
      receive second audio data from the agent device, wherein the second audio data represents a second utterance of the agent during the customer contact;
      generate second text data representing the second utterance using the second audio data;
      generate second sentiment feature data using the second text data, wherein the second sentiment feature data represents a sentiment associated with the second utterance;
      generate second speech feature data using the second audio data, wherein the second speech feature data represents an emotion associated with the second utterance; and
      generate a second satisfaction score using the second sentiment feature data, the second speech feature data, and the model.

2. The system of claim 1, wherein the customer service contact interaction comprises at least one of a text to be read or an action to be performed, wherein the customer service contact interaction is one of a plurality of recommended interactions stored in a data store, and wherein the customer service contact interaction is mapped to the satisfaction score.

3. A computer-implemented method comprising:
   as performed by a computing system comprising one or more computer processors configured to execute specific instructions,
      determining a contact classification for a customer service contact based at least partly on data regarding the customer service contact;
      obtaining an agent state score representing a sentiment of an agent based on one or more prior customer service contacts assigned to the agent;
      prior to beginning the customer service contact, determining to assign the customer service contact to the agent based at least partly on the contact classification and the agent state score;
      receiving audio data representing an utterance associated with the customer service contact;
      generating sentiment feature data using the audio data, wherein the sentiment feature data represents a sentiment based at least partly on one or more words of the utterance;
      generating speech feature data using the audio data, wherein the speech feature data represents an emotion based at least partly on one or more acoustic features of the utterance;
      generating a state score using a model, wherein the state score is generated based on the sentiment feature data and the speech feature data;

determining a customer service contact interaction based at least partly on an expected effect on the customer service contact;

performing an action associated with the customer service contact interaction;

receiving second audio data, wherein the second audio data represents a second utterance of the agent during the customer service contact;

generating second sentiment feature data using the second audio data, wherein the second sentiment feature data represents a sentiment associated with the second utterance;

generating second speech feature data using the second audio data, wherein the second speech feature data represents an emotion associated with the second utterance; and generating a second state score associated with the agent using the model, wherein the second state score is generated based on the second sentiment feature data and the second speech feature data.

4. The computer-implemented method of claim 3, further comprising generating data for a visual representation of the state score and a plurality of prior state scores, wherein the plurality of prior state scores are generated during the customer service contact using audio data representing prior utterances associated with the customer service contact.

5. The computer-implemented method of claim 3, wherein performing the action associated with the customer service contact interaction comprises generating graphical user interface data comprising a visual representation of the customer service contact interaction.

6. The computer-implemented method of claim 3, further comprising:

generating, using the state score, customer service contact evaluation data representing one or more evaluation questions; and sending the evaluation data to a computing device associated with the customer service contact.

7. The computer-implemented method of claim 3:

wherein generating the sentiment feature data comprises:
generating a first sentiment score representing a degree to which the utterance corresponds to a first sentiment; and
generating a second sentiment score representing a degree to which the utterance corresponds to a second sentiment; and wherein the computer implemented method further comprises determining that the utterance corresponds to the first sentiment based at least partly on an analysis of the first sentiment score with respect to the second sentiment score.

8. The computer-implemented method of claim 3:

wherein generating the speech feature data comprises:
generating a first emotion score representing a degree to which the audio data corresponds to a first emotion; and
generating a second emotion score representing a degree to which the audio data corresponds to a second emotion; and wherein the computer implemented method further comprises determining that the audio data corresponds to the first emotion based at least partly on an analysis of the first emotion score with respect to the second emotion score.

9. The computer-implemented method of claim 3, further comprising generating agent training data is based at least partly on the second state score.

10. A system comprising:

computer-readable memory storing executable instructions; and one or more processors in communication with the computer-readable memory and configured by the executable instructions to at least:

prior to beginning a customer service contact, determine to assign the customer service contact to an agent based at least partly on an agent state score, wherein the agent state score represents a sentiment of the agent based on one or more prior customer service contacts assigned to the agent;

receive audio data representing an utterance associated with the customer service contact;

generate sentiment feature data using the audio data, wherein the sentiment feature data represents a sentiment associated with the utterance;

generate speech feature data using the audio data, wherein the speech feature data represents an emotion associated with the utterance;

generate a state score using a model, wherein the state score is generated based on the sentiment feature data and the speech feature data;

perform an action associated with the customer service contact based at least partly on the state score;

receive second audio data representing a second utterance associated with the customer service contact, wherein the second utterance is made by the agent;

generate second sentiment feature data using the second audio data, wherein the second sentiment feature data represents a sentiment associated with the second utterance;

generate second speech feature data using the second audio data, wherein the second speech feature data represents an emotion associated with the second utterance; and generate a second state score associated with the agent using the model, wherein the second state score is generated based on the second sentiment feature data and the second speech feature data.

11. The system of claim 10, wherein the one or more processors are further configured to determine a contact classification for the customer service contact based at least partly on data regarding the customer service contact, wherein the customer service contact is assigned to the agent based on the agent state score and the contact classification.

12. The system of claim 11, wherein the contact classification represents an expected level of difficulty of the customer contact.

13. The system of claim 12, wherein the customer service contact being assigned to the agent based on the agent state score and the contact classification comprises the customer service contact being assigned to the agent based on the expected level of difficulty and the agent state score.

14. The system of claim 11, wherein to determine the contact classification for the customer service contact based at least partly on data regarding the customer service contact, the one or more processors are configured by the executable instructions to determine the contact classification based on data representing at least one of: a customer associated with the customer service contact, historical information regarding prior customer service contacts involving the customer, an issue that gave rise to the customer service contact, or an expected amount of time to resolve the customer service contact.

15. The system of claim 10, wherein the action associated with the customer service contact comprises at least one of:

generating user interface data for displaying the state score or a visual representation of a customer service contact interaction; transmitting the state score or data representing the customer service contact interaction to an agent computing device; or altering a speech characteristic of an automated dialog system.

16. The system of claim 10, wherein the one or more processors are further configured to at least:
   receive attribute data representing an attribute of a second customer service contact;
   determine, based at least partly on the attribute data and the second state score, to assign the second customer service contact to the agent; and
   connect a voice call, associated with the second customer service contact, to a computing device associated with the agent.

17. The system of claim 10, wherein the one or more processors are further configured to determine a customer service contact interaction based at least partly on an expected effect on the customer service contact, wherein the expected effect on the customer service contact comprises an expected effect on at least one of: second sentiment feature data generated using second audio data representing a second utterance associated with the customer service contact; second speech feature data generated using the second audio data; or a second state score generated using the second sentiment feature data and the second speech feature data.

* * * * *

UNITED STATES PATENT AND TRADEMARK OFFICE
CERTIFICATE OF CORRECTION

PATENT NO. : 10,896,428 B1  
APPLICATION NO. : 15/842716  
DATED : January 19, 2021  
INVENTOR(S) : Balarajan Balasubramaniam It is certified that error appears in the above-identified patent and that said Letters Patent is hereby corrected as shown below:

In the Claims

In Column 22, Line 17, Claim 1, delete "customer;" and insert --customer device;--.

In Column 25, Line 22, Claim 17, delete "second" and insert --third--.

In Column 25, Line 23, Claim 17, delete "second" and insert --third--.

In Column 25, Lines 23-24, Claim 17, delete "second" and insert --third--.

In Column 25, Line 25, Claim 17, delete "second" and insert --third--.

In Column 25, Line 25, Claim 17, delete "second" and insert --third--.

In Column 25, Line 26, Claim 17, delete "second" and insert --third--.

In Column 25, Line 26, Claim 17, delete "second" and insert --third--.

In Column 25, Line 27, Claim 17, delete "second" and insert --third--.

Signed and Sealed this  
Sixteenth Day of March, 2021

Drew Hirshfeld  
*Performing the Functions and Duties of the  
Under Secretary of Commerce for Intellectual Property and  
Director of the United States Patent and Trademark Office*